V. A. FYNN.
ALTERNATING CURRENT MOTOR.
APPLICATION FILED FEB. 21, 1910.
1,010,135.
Patented Nov. 28, 1911.
Fig. 1.
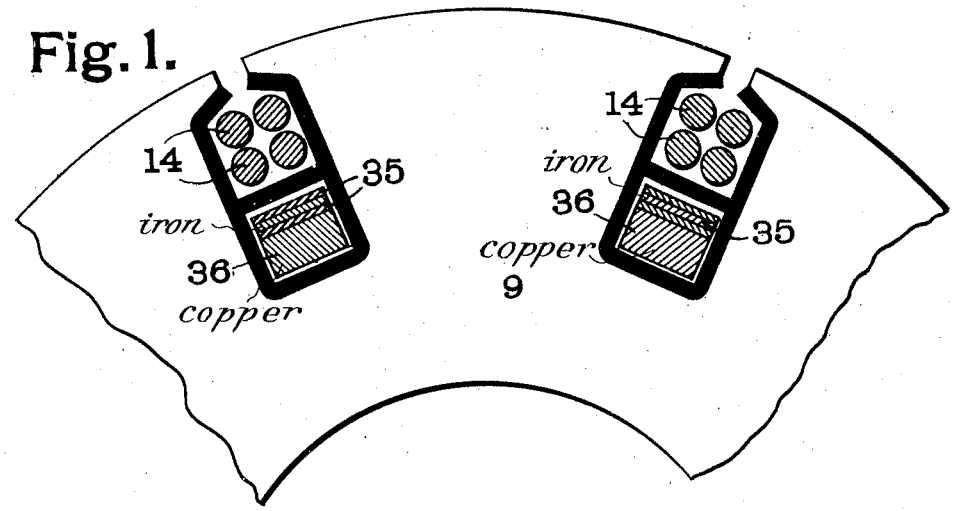
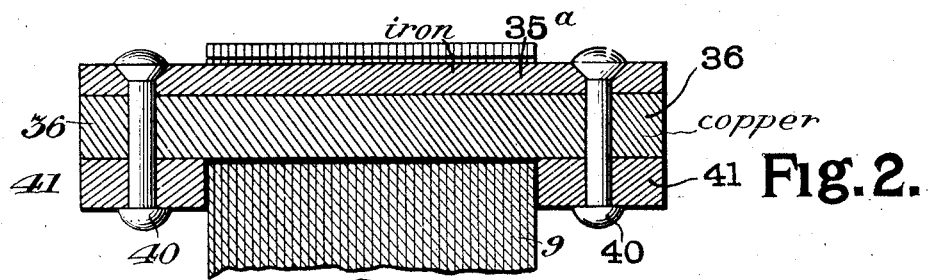
Fig. 2.
Fig. 3.
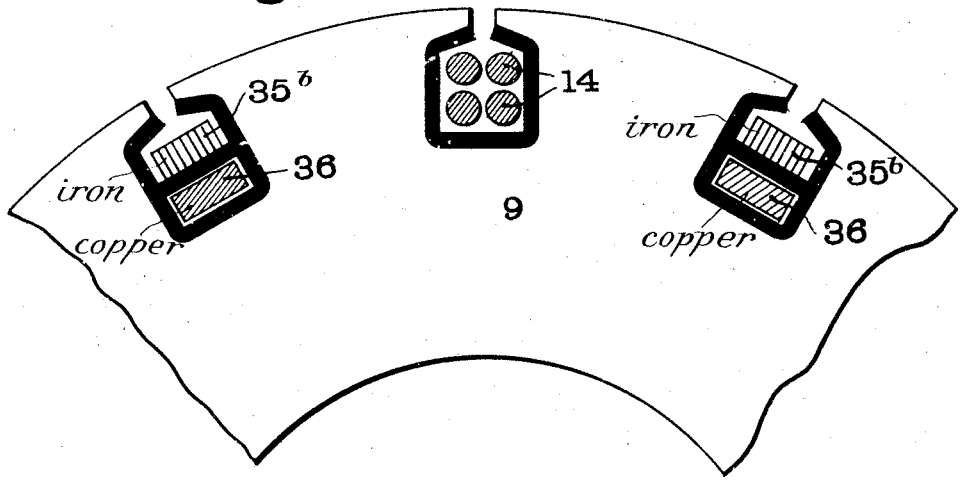
WITNESSES:
L. L. Mead.
W. A. Alexander.
INVENTOR
Valère A. Fynn
BY
Fowler & Huffman
ATTORNEYS

UNITED STATES PATENT OFFICE.

VALÈRE ALFRED FYNN, OF LONDON, ENGLAND.

ALTERNATING-CURRENT MOTOR.

1,010,135.  Specification of Letters Patent.  Patented Nov. 28, 1911.

Application filed February 21, 1910. Serial No. 545,002.

*To all whom it may concern:*

Be it known that I, VALÈRE ALFRED FYNN, a subject of the King of England, residing at London, W. C., England, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to the induced members of alternating current motors and more particularly to those having a permanently short-circuited winding, such as a squirrel-cage, together with a commuted winding. This application is a continuation in part of matter contained in my former application Serial No. 506,955, filed July 10, 1909. It has been proposed to place the squirrel-cage winding of such motors in slots situated within the zone of those carrying the commuted winding and separated from the latter by a certain radial depth of the rotor laminations with the object of improving the starting performance. Tests have shown that under such conditions the permanently short-circuited winding is practically as ineffective under normal running conditions as it is at starting.

It is the object of my invention to provide between the commuted and the permanently short-circuited windings, a magnetic shunt or bridge which will be inductively responsive to any varying flux tending to thread said magnetic shunt or bridge. I therefore so constitute this magnetic shunt as to facilitate the formation of Foucault currents therein, which I utilize to produce a useful screening effect, *i. e.* to diminish the amount of flux which would otherwise thread this bridge.

The frequency of the current in each conductor of the permanently short-circuited winding of a self-excited single-phase shunt induction motor is twice as great in normal operation as it is at the moment of starting. The frequency of the self-induced flux surrounding these conductors in normal operation will, therefore, be twice as great as at the moment of starting. Since Foucault currents increase with the frequency then the screening effect of my inductively responsive shunt will be considerably greater in normal operation than it is at the moment of starting. The self-induction of the permanently short-circuited winding which depends on the amount of flux locally surrounding it, will, therefore, be relatively large at starting, and small in normal operation. A large self-induction of the permanently short-circuited winding at starting is beneficial, inasmuch as a comparatively small induced current in such a winding is then sufficient to force much of the main inducing flux to thread the magnetic shunt and thus link with the commuted winding without linking with the permanently short-circuited winding. A small self-induction of this winding in normal operation is essential in order to fully utilize the copper on the induced member and to secure a commercially satisfactory output for weight.

In building rotors for single-phase motors it is necessary in order to secure an even commercially acceptable efficiency, to make use of very thin and very carefully insulated laminations. The main object of such a structure is to reduce the Foucault currents therein to a negligible amount. This object is so easily attained in practice in the manner described that the rotor laminations of a commercial single-phase motor may be said to show no inductive response to any varying flux tending to thread them. A magnetic bridge formed by the rotor laminations themselves would therefore be entirely ineffective for the purpose of the present invention. In order to achieve my object I so construct my magnetic bridge that it will be more inductively responsive to a flux of given magnitude and frequency than any part of the rotor laminations. I can do this without impairing the running efficiency of my motor because it is not only not necessary that any flux shall thread the magnetic bridge in normal operation but it is even detrimental to the machine that such be the case. It is only necessary that a flux shall thread this bridge at starting. Since my magnetic bridge is made inductively responsive the screening effect will, as already explained, be greater in normal operation than at the moment of starting and will thus facilitate the starting of the motor without materially impairing its running efficiency.

In the preferred form of my invention, I dispose the commuted and the permanently short-circuited windings in the same slots, arrange the magnetic material forming my inductively responsive magnetic shunt between the two and conductively secure said magnetic material to the permanently short-circuited winding. I thus secure a sound mechanical construction and can take advantage of the conductivity of the magnetic material for the purpose of increasing the effective cross-section of the conductors of the permanently short-circuited winding.

In the accompanying drawings Figure 1 indicates the preferred arrangement of the windings and the magnetic shunt in the rotor; Fig. 2 illustrates one way of securing the inductively responsive magnetic shunt to the conductors of the permanently short-circuited winding; Fig. 3 indicates a modified construction of the inductively responsive magnetic bridge and shows the two rotor windings in separate but adjacent slots.

In Fig. 1 the commuted winding 14 and the permanently short-circuited winding 36 are shown in the same slots and are separated by an inductively responsive magnetic shunt 35. This magnetic shunt is composed of iron or steel strips lying parallel to the active portions of the rotor conductors, and in electrical contact with each other. This bridge therefore consists of one element only in the electrical sense. The fact that this element is composed of three parts in electrical contact with each other merely increases its ohmic resistance in the direction of the flow of the induced Foucault currents. This bridge is made more inductively responsive than the rotor laminations by the fact that the smallest dimension of one element of this bridge as measured in the plane of the induced Foucault currents is greater than the thickness of one sheet of the rotor laminations.

In Fig. 2 is shown one way of conductively securing the inductively responsive magnetic shunt 35$^a$ to the conductors 36 of the permanently short-circuited winding. This winding is here shown as being of the squirrel-cage type and the magnetic shunt is supposed to consist by way of example of a solid steel bar 35$^a$ of same length as the squirrel-cage bars. The rivets 40 secure 35 to 36 and to the end rings 41 of the squirrel-cage. The radial thickness of this bar whose length exceeds the width of the rotor laminations is greater than the thickness of one sheet of the rotor laminations and this magnetic shunt is therefore more inductively responsive than the rotor laminations.

In Fig. 3 the rotor carries a commuted winding 14 and a permanently short-circuited winding 36. They are disposed in alternate slots and the inductively responsive magnetic shunt consists of radially laminated strips 35$^b$ located in the same slots as 36 and placed above that winding. This shunt consists of one element formed by eight long sheets of laminations placed on edge and in electrical contact with each other. It is more inductively responsive than the rotor laminations because its length and its radial width are greater than the thickness of one sheet of the rotor laminations. Because of the presence of the inductively responsive shunt 35$^b$ the self induction of the permanently short-circuited winding 36 will, as previously explained, be smaller in normal operation than at starting and the screening effect of said winding will therefore be greater at starting than in normal operation with the result that much of the main flux will be forced to thread the bridge 35$^b$ and will miss the squirrel-cage at starting while still linking with the commuted winding, thus improving the starting performance.

It is well known that the functions of the rotor and the stator of a motor can be interchanged without modifying the mode of operation of the machine. It will be understood, therefore, that by the word "rotor", as used in the specification and claims I mean the induced member of the motor.

I prefer to use the rotor described and claimed in this specification in the type of motor shown for instance in my United States Patents Nos. 967,362 and 967,363 dated August 16, 1910.

Having fully described my invention, what I claim as new and desire to secure by Letters Patent of the United States is:

1. A laminated rotor having two windings one of which is permanently short-circuited, a magnetic bridge lying above the conductors of the permanently short-circuited winding, said magnetic bridge having at least one element whose dimension in the direction parallel to the rotor shaft is greater than the thickness of the rotor laminations.

2. A laminated rotor having a commuted winding, a permanently short-circuited winding and a magnetic bridge lying above the conductors of the permanently short-circuited winding, said magnetic bridge having at least one element whose dimension in the direction parallel to the rotor shaft is greater than the thickness of the rotor laminations.

3. A rotor having a commuted winding and a squirrel-cage winding in the same slots, said commuted winding lying above the squirrel-cage winding, and a magnetic bridge inductively responsive to a part of the flux linking with the conductors of the squirrel-cage winding, said magnetic bridge lying above said conductors.

4. A laminated rotor having a commuted winding, a permanently short-circuited winding, and a magnetic bridge lying above the conductors of the permanently short-circuited winding, said bridge having at least one element whose length approximately equals the width of the rotor.

5. A laminated rotor having a commuted winding, a permanently short-circuited winding, and an inductively responsive magnetic bridge lying above the conductors of the permanently short-circuited winding and in electrical contact therewith.

In testimony whereof, I have hereunto set my hand and affixed my seal in the presence of two subscribing witnesses.

VALÈRE ALFRED FYNN. [L. S.]

Witnesses:
E. E. HUFFMAN,
A. C. FOWLER.